[12] United States Patent
Eldridge et al.

[10] Patent No.: US 11,726,765 B2
[45] Date of Patent: Aug. 15, 2023

(54) PERSONALIZED APPLICATION CONFIGURATION AS A SERVICE

(71) Applicant: Google LLC, Mountain View, CA (US)

(72) Inventors: Erik Eldridge, Burlingame, CA (US); Alex David Lester, Mountain View, CA (US); Jon Mensing, San Francisco, CA (US); Xin Wei, Hayward, CA (US); Victor Lum, San Mateo, CA (US); Dana Silver, Larkspur, CA (US); Liang Dong, Sunnyvale, CA (US); Matthew Watson, San Francisco, CA (US); Vinkatram Jaltar, Sunnyvale, CA (US); Ryan Vernon, New York, NY (US); Yanli Li, Santa Clara, CA (US); Viren Baraiya, Cupertino, CA (US); Hamid Mousavi, Mountain View, CA (US); Rajendra Gundluru, San Ramon, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 17/400,602

(22) Filed: Aug. 12, 2021

(65) Prior Publication Data
US 2023/0045909 A1 Feb. 16, 2023

(51) Int. Cl.
*G06F 8/65* (2018.01)
*G06N 20/00* (2019.01)

(52) U.S. Cl.
CPC .............. *G06F 8/65* (2013.01); *G06N 20/00* (2019.01)

(58) Field of Classification Search
CPC ....... G06F 8/65; G06F 9/44505; G06N 20/00; G06N 3/00
See application file for complete search history.

(56) References Cited

U.S. PATENT DOCUMENTS

| | | | | |
|---|---|---|---|---|
| 5,247,683 A * | 9/1993 | Holmes | ..................... | G06F 8/65 717/176 |
| 6,907,420 B2 * | 6/2005 | Gensel | ..................... | G06F 8/20 707/999.102 |
| 9,067,140 B2 * | 6/2015 | Opaluch | ................. | A63F 13/63 |
| 9,753,618 B1 * | 9/2017 | Jain | .......................... | G09B 7/02 |
| 10,241,783 B2 * | 3/2019 | Dayan | ...................... | G06F 8/71 |

(Continued)

OTHER PUBLICATIONS

Eldridge et al., "Providing Dynamic App Parameter Values Via a Remote Configuration Service", Technical Disclosure Commons, (Nov. 10, 2020) 9 Pages.

(Continued)

*Primary Examiner* — Daxin Wu
(74) *Attorney, Agent, or Firm* — Lerner David LLP

(57) ABSTRACT

A system and method for conducting a parameter update event including one or more processors for transmitting first parameter settings to a program used by multiple users, such as a mobile device application at a plurality of mobile devices, receiving performance information indicating performance of the program after the first parameter setting, the performance information for each user being separately identifiable, and for each individual user of the plurality of users, determining a parameter setting update based at least in part on the performance information of the individual user and transmitting the parameter setting update to the program.

18 Claims, 6 Drawing Sheets

(56) References Cited

U.S. PATENT DOCUMENTS

| | | | |
|---|---|---|---|
| 10,667,157 B2 | 5/2020 | Rahmati et al. | |
| 2007/0271368 A1* | 11/2007 | Liu | G06F 11/3452 |
| | | | 714/E11.197 |
| 2009/0131152 A1* | 5/2009 | Busse | H04N 21/4826 |
| | | | 463/23 |
| 2010/0235813 A1* | 9/2010 | Manczak | G06F 8/71 |
| | | | 717/121 |
| 2014/0004925 A1* | 1/2014 | Jacob | G06F 3/04815 |
| | | | 463/43 |
| 2014/0137097 A1* | 5/2014 | Sakai | G06F 8/65 |
| | | | 717/172 |
| 2014/0230031 A1* | 8/2014 | Schneider | H04W 12/06 |
| | | | 726/6 |
| 2014/0358966 A1* | 12/2014 | Mueller | H04L 63/08 |
| | | | 707/769 |
| 2015/0046915 A1* | 2/2015 | Oliver | H04L 67/306 |
| | | | 717/170 |
| 2017/0187866 A1* | 6/2017 | Li | G06F 3/04883 |
| 2020/0357013 A1* | 11/2020 | Yang | G06K 9/6256 |
| 2020/0396148 A1 | 12/2020 | Schibler et al. | |
| 2021/0232934 A1* | 7/2021 | Lai | G06N 5/003 |
| 2021/0374241 A1* | 12/2021 | Parikh | G06K 9/6262 |

OTHER PUBLICATIONS

International Search Report and Written Opinion for International Application No. PCT/US2022/040043 dated Nov. 14, 2022. 12 pages.

\* cited by examiner

PERSONALIZED APPLICATION CONFIGURATION AS A SERVICE

BACKGROUND

Mobile application (app) and game developers often utilize cloud-based services to specify and update app parameters such as color, images, text etc. for apps that run on mobile devices. Cloud-based updating of parameters enables a developer to selectively control the behavior and features of an app remotely without having to publish an app update. For example, features of the app such as its look-and-feel, in-app offers and advertising content can be updated without requiring the user to download an updated version of the app. The developer may define in the cloud-based service a template that includes configuration values for various app settings. The app may then be configured remotely by fetching the values for those settings from a remote server of the cloud-based service.

Developers can manually specify configuration values for different segments of users, such as all users of a certain country or region. After the segments have been set and configuration values sent to each segment, A/B testing can be used to evaluate the performance of the configuration values in each segment.

However, manually specifying configuration values is time consuming. Furthermore, identifying optimal configuration values for each individual user is tedious to the point of infeasibility.

BRIEF SUMMARY

The present disclosure is capable of optimizing configuration values for individual users through a app configuration event that collects data from several users, analyzes the data to train a machine learning algorithm or model, and then uses the model to predict user-specific behaviors on a user-by-user basis in order to determine parameter settings specific for each user.

In one aspect, the disclosure is directed to a method of conducting a parameter update event including: transmitting, by one or more processors, first parameter settings to a program; receiving, by the one or more processors, performance information indicating performance of the program for a first plurality of users after the first parameter setting, wherein the performance information for each user is separately identifiable; for each individual user of the first plurality of users: determining, by the one or more processors, a user-specific parameter setting update based at least in part on the performance information of the individual user; and transmitting, by the one or more processors, the user-specific parameter setting update to the program.

In some examples, the user-specific parameter setting update may be determined based further on past performance information of the user before the first parameter setting.

In some examples, the parameter setting update may be determined based further on performance information of other users of the first plurality of users after the first parameter setting.

In some examples, receiving performance information, determining a parameter setting update, and transmitting the parameter setting update may be repeated periodically according to a predetermined frequency for updating the program.

In some examples, the predetermined frequency may be between one hour and one week. The method may further include: receiving, by the one or more processors, a parameter update event instruction indicating available parameter settings and an objective. The first parameter settings and the user-specific parameter setting updates may be selected from the available parameter settings. The user-specific parameter setting updates may be determined based on the objective. The objective may include one or more factors defined by user interaction with the program. The one or more factors may include at least one of: money spent in the program; time spent interacting with the program; times opening the program; or user-rating of the program.

In some examples, the method may further include, in response to receiving the performance information, calculating, by the one or more processors, a test group score for the first plurality of users, wherein a higher score is indicative of greater fulfillment of the objective. The method may further include, in response to a request for analysis of the parameter update event, transmitting, by the one or more processors, data indicating one or more changes to the group score over time.

In some examples, the method may further include: designating, by the one or more processors. a second plurality of users of the program as a control group; and for each individual user of the second plurality of users, transmitting, by the one or more processors, a randomly selected user-specific parameter setting update to the program; and receiving, by the one or more processors, performance information indicating performance of the program for the second plurality of users after the randomly selected user-specific parameter setting update. The method may further include, in response to receiving the performance information for the first and second pluralities of users: calculating, by the one or more processors, a test group score for the first plurality of users, wherein a higher test group score is indicative of greater fulfillment of the objective; and calculating, by the one or more processors, a control group score for the second plurality of users, wherein a higher control group score is indicative of greater fulfillment of the objective. The method may further include, in response to a request for analysis of the parameter update event, transmitting, by the one or more processors, data providing a comparison between the test group score and the control group score.

In some examples, the program may be one of a mobile device application or a web application. Transmitting the first parameter settings to the program may include transmitting the first parameter settings to the mobile device application at a plurality of mobile devices or to the web application.

Another aspect of the disclosure is directed to a system for conducting a parameter update event including: one or more processors; and memory storing instructions configured to cause the one or more processors to: transmit first parameter settings to an application used by a first plurality of users; receive performance information indicating performance of the application after the first parameter setting, the performance information for each individual user of the first plurality of users being separately identifiable; and for each individual user of the first plurality of users: determine a parameter setting update based at least in part on the performance information of the individual user; and transmit the parameter setting update to the application of the individual user.

In some examples, the instructions may be configured to cause the one or more processors to repeatedly receive performance information, determine a parameter setting update, and transmit the parameter setting update periodically according to a predetermined frequency for updating the application. The instructions may include a machine learning algorithm to determine the parameter setting update. The machine learning algorithm may be a linear regression model trained on at least one of: past performance information of the individual user before the first parameter setting; performance information of other users of the first plurality of users before the first parameter setting; or performance information of other users of the first plurality of users after the first parameter setting.

In some examples, the instructions may be configured to cause the one or more processors to: designate a second plurality of users as a control group; for each individual user of the second plurality of users, transmit a random parameter setting update for the individual user; and receive performance information indicating performance of the application for the second plurality of users after the random parameter setting update. The instructions may be configured to cause the one or more processors to, in response to a request for analysis of the parameter update event, transmit data providing a comparison between the performance information from the second plurality of users and the performance information from the first plurality of users.

DETAILED DESCRIPTION

Overview

The present disclosure provides a method and system capable of optimizing configuration values for each individual user of a program or application or "app" using machine learning. In operation, an event for optimizing configuration values may involve configuration values (and referred to herein as "parameter values") for various app parameters being provided to individual users of the app. A given event may involve adjusting a single parameter in order to optimize the single parameter for each user, or adjusting multiple parameters in order to optimize the combination of parameters for each user. Each parameter may be optimized to meet a certain objective. The objective may be a single factor, such as user time spent on the app, times a user opens the app, or in-app purchases, or a compound objective including multiple factors, which may or may not be weighted. Values for each parameter of the given event may be selected for each user from two or more available options.

After each user device's app has been reconfigured according to the selected parameters, user performance information indicating a user's interaction with the app may be collected. The collected information may be analyzed by a machine learning model. The machine learning model can determine an adjustment to the app parameters, and the individual user's app may be updated based on the model's determination. The process of adjusting app parameters, then collecting and analyzing user performance information, can be cyclically repeated in order to evaluate whether parameter changes improve or worsen the user's interaction with the app, and over time optimize the user's interaction.

In some instances, in order to ensure that the machine learning model is improving user experiences, a control group of users can be established. For the control group, app parameter values may be chosen at random, adjusted at random, or both. User interaction of a test group of users can then be compared to user interaction of the control group. If user interaction in the test group is greater than in the control group, this can indicate that the machine learning model is performing well. Otherwise, adjustments may be made to the model, such as ending the test, adjusting parameters based on performance in the control group, or both.

Figure 1:
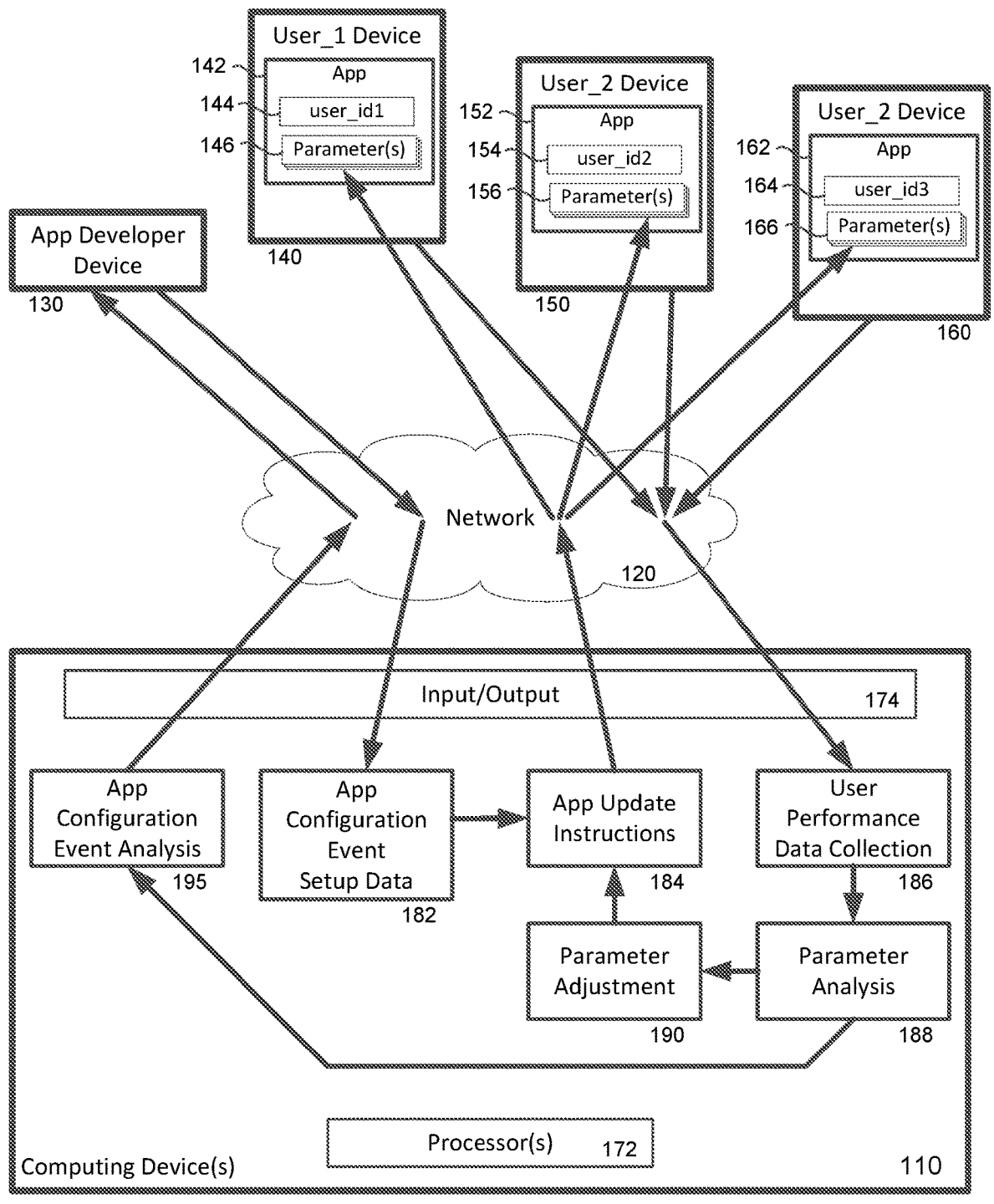
FIG. 1 is a functional block diagram of a system in accordance with an aspect of the disclosure.

These methods and systems permit for app developers to deploy user-optimized configurations to a given app with relatively minimal effort. After the app developer defines an event, selects the parameters to be adjusted in the event, and selects the value options and objective for each parameter, the system may automatically reconfigure apps with the goal of optimization on a user-by-user basis. Furthermore, the implementation of the present disclosure allows for app developers to quickly and intuitively assess whether the machine learning model responsible for optimization is operating correctly or effectively. These advantages provide users with an improved, personalized app experience, while also significantly reducing the time and effort required for the developer to provide such an experience Example Systems FIG. 1 illustrates a system 100 for updating parameters of a user device application (or "app" for short) on a user-by-user basis. The system 100 includes one or more computing devices 110 that are connected through a network 120 to at least one app developer device 130 and to a plurality of user devices 140, 150, 160. In the example of FIG. 1, the user devices are referred to as mobile devices such as laptops, smartphones, tablets, global positioning system (GPS) trackers, pagers, and so on, although in other instances the user devices may include non-mobile devices such as a desktop computer, server and so on. Similarly, the app developer device 130 may be a mobile or non-mobile computing device capable of communicating with the one or more computing devices 110 over the network 120. Communications between the user devices 140, 150, 160 or app developer device 130 and the one or more computing devices 110 may be transmitted and received over the network 120 using various configurations and protocols, including but not limited to short range communication protocols such as near-field communication (NFC), Bluetooth™ or Bluetooth™ Low Energy (LE) communications, an intranet connection, an Ethernet connection, a Wi-Fi connection, a local network, an internet connection, HTTP, a virtual private network, a wide area network, other private networks using proprietary communication protocols, or any combination thereof.

Each user device 140, 150, 160 may be operated by a respective user of the app. Additionally, each user device 140, 150, 160 may have installed thereon a copy of the app 142, 152, 162. In other instances, the app may be a fully or partially web-based application, whereby the web-based portions of the app accessible to each user through the network 120. The app 142, 152, 162, of each respective user may be associated with or have stored thereon a respective user identification 144, 154, 164. The identification may be any type of identifier associated with the user of the user's device, such as a username, a mobile device identification, a user account identification, or the like, a hash or other unique identifier derived from a user or user device identification. The app 142, 152, 162 of each respective user may also be programmed with respective parameters 146, 156, 166 for tailoring an experience of the app to its respective user. The parameters may be associated with the respective user identification 144, 154, 164 in order to maintain a user specific association between the user's copy of the app 142, 152, 162 and the user's specific parameters 146, 156, 166. Apps of different users may be associated with different parameters. Example parameters of a given app may include, by way of example, the color of a button in a user interface of the app, or a discount available to the user in the app. In the case of an app that is or includes a game, a difficulty of the game may be controlled by a parameter.

The one or more computing devices 110 may include servers, shards, cells, or the like. Additionally, the computing devices 110 may be distributed across a distributed network, may be communicatively coupled to one another over the network 120, or a combination thereof. Thus, for example, the computing device operations may be executed in "the cloud." Such operations may include uploading, accessing or processing data.

The one or more computing devices 110 may further include memory for storing the uploaded, accessed or processed data, and one or more processors 172 for carrying out instructions stored in the memory. The memory may be a type of non-transitory computer readable medium capable of storing information accessible by the processor 172, such as a hard-drive, solid state drive, tape drive, optical storage, memory card, ROM, RAM, DVD, CD-ROM, write-capable, and read-only memories. The one or more processors 172 can include any one or combination of well-known processors or other lesser-known types of processors. Further, the one or more processors 172 can include a collection of processors, which may or may not operate in parallel. Additionally or alternatively, the one or more processors 172 can include dedicated controllers such as an ASIC Although FIG. 1 functionally illustrates the processors and other components of the one or more computing devices 110 as being within the same block, it should be understood that the computing devices may actually include multiple processors, multiple memories, or both, that may or may not be stored within the same physical housing. For example, some of the data and instructions can be stored on a removable CD-ROM and others within a read-only computer chip, or in a location physically remote from, yet still accessible by, the processors 172.

The one or more computing devices 110 may further include communication devices 174 to enable input and output between the computing devices 110 and other network connected devices. The communication devices 174 may include cabling, routers, and the like, and may facilitate communication with the app developer device 130 and user devices 140, 150, 160. For instance, the one or more computing devices 110 may store a web application that is accessible to the app developer device 130, and that is further capable of communication with various apps that may programmed on the user devices 140, 150, 160. Accessibility by the app developer device 130 may permit for the app developer to transmit instructions to the computing devices 110, such as instructions to set new parameters, initiate new app configuration events, and access data logs showing analysis of effects of the app configuration events. Communication with the user devices 140, 150, 160 may facilitate the computing devices 110 to transmit instructions to the user devices 140, 150, 160, such as sending parameter updates to an app at the user devices 140, 150, 160, or requesting user performance data from the user devices 140, 150, 160. These and other operations will be described in greater detail herein.

Figure 2:
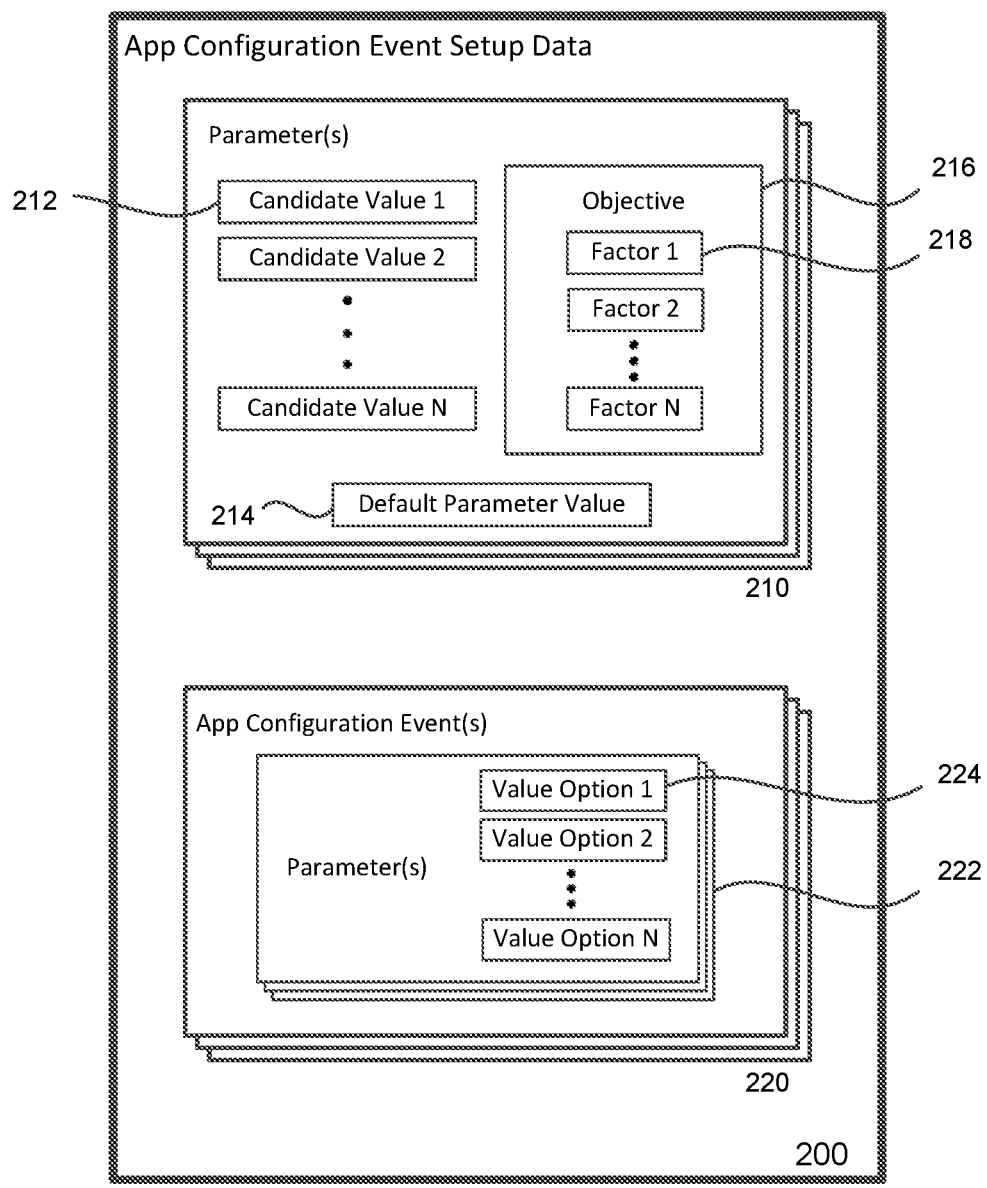
FIG. 2 is a block diagram of example app configuration event setup data for use in of the system of FIG. 1.

In operation, the one or more computing devices 110 may collect app configuration event setup data 182 from the app developer device 130 via the network 120 in order to set up an upcoming app configuration event. An example of app configuration event setup data is shown in FIG. 2. The app configuration event setup data 200 includes a plurality of parameters 210. Each parameter 210 may include a plurality of candidate values 212. For instance, different parameter values may be appropriate for different users in order to maximize each user's enjoyment or engagement with the associated app. Also, by providing multiple candidate values for a given parameter, it may be possible to tailor each user's experience of the app to optimize user enjoyment and engagement. User-optimized parameter values may be determined through an app configuration event in which each user's parameters are individually adjusted according to that user's interaction with the app.

For each parameter, the app configuration event setup data 200 may further indicate a default parameter value 214. The default parameter value 214 may be an initial value of the parameter to which the app of every user is set prior to an app configuration event. Each parameter 210 may also include a respective objective 216. The objective 216 may have a single factor, or may be a compound objective including multiple factors 218 that may or may not be weighted or normalized. The combination of factors 218 in the compound objective may represent an optimization of user enjoyment or engagement with the app. Example objectives may include, but are not limited to: money spent by the user in the program; time spent by the user interacting with the program; times the user opens the program; or a user-rating of the program. It should be noted that the compound objective is not a plurality of separate objectives but rather constitutes a single objective made of multiple factors. For instance, the compound objective may strike a balance between competing factors.

The app configuration event setup data 200 may further include one or more app configuration events 220 predefined by the app developer. A app configuration event may involve adjusting various parameters of the app on a user-by-user basis over time in order to provide an improved user experience for each user of the app. For a given app configuration event 220, the event may define each of the parameters 222 that are subject to adjustment over the duration of the event, as well as the particular candidate values 224 that each parameter may be adjusted to. For a given parameter, the particular candidate values 224 may include all of candidate values 112 associated with the parameter, or may include only a subset of those candidate values 112.

The available parameter settings for a given app configuration event may be defined by an input received from an app developer device, such as device 130 of FIG. 1. The app developer device 130 may further instruct the one or more computing devices 110 to initiate a given app configuration event 220, or may designate a time for the app configuration event to begin. Until the app configuration event begins, the parameters that are subject to adjustment during the event may be preset in the respective apps of the user devices 140, 150, 160 to their default parameter values 214.

Upon beginning an app configuration event, the one or more computing devices 110 may transmit update instructions 184 to the apps 142, 152, 162 of the respective user devices 140, 150, 160 via the network 120. The app update instructions 184 may provide a first parameter setting to each app, which may be stored in the parameters 146, 156, 166 of the user devices 140, 150, 160. The first parameter setting may be the same for all users or may be different.

After a predetermined amount of time, the one or more computing devices may collect user performance data 186 from the respective user devices. User performance data may indicate performance of the app for each of the users. Additionally, user performance data for each user may be separately identifiable according to the user's respective identification 144, 154, 164. The user performance data may provide feedback about the various factors that affect each parameter of the app configuration event. The one or more computing devices 110 may analyze 188 each parameter of the app configuration events according to the collected user performance data. Based on this analysis, the one or more computing devices 110 may determine to adjust 190 one or more parameters of the app. This analysis may be conducted on a user-by-user basis in order to set user-specific parameters for each user.

Parameter analysis 188 may involve processing the received user performance data using a separate analytics service in order to infer or derive information about user behaviors. For instance, information related to the one or more factors of a given parameter's objectives could be determined during the parameter analysis 188. A cloud-based platform, such as a web analytics platform, could be used to facilitate the analysis. The analyzed data could be to train the model in view of past predictions, and in turn to inform and improve current and future predictions.

In one example, in the case of a parameter controlling the difficulty of a game, the one or more computing devices 110 may analyze user performance data of a first user that quickly advances through the game, and determine to adjust the difficulty of the first user's app to a more difficult setting. The one or more computing devices 110 may also analyze user performance data of a second user that slowly advances through the game, and determine to adjust the difficulty of the second user's app to an easier setting. In such an example, the objective of the difficulty parameter may be to maximize user time spent playing the game.

In another example, in the case of a parameter controlling the cost of an in app purchase, and the one or more computing devices 110 may analyze user performance data of a first user that frequently makes in app purchases and determine to maintain or increase the cost of the items for purchase in the first user's app. The one or more computing devices 110 may also analyze user performance data of a second user that does not make in app purchases and determine to decrease the cost of the items for purchase in these second user's app. In such an example, the objective of the cost parameter may be to maximize revenue due to in-app purchases by users.

In yet another example, in the case of a parameter controlling the color of a button in the app, and the one or more computing devices 110 may analyze user performance data of a first user that frequently interacts with the button and determine to maintain the color of the button in the first user's app. The one or more computing devices 110 may also analyze user performance data of a second user that does not frequently interact with the button, and determine to change the color of the button in the second user's app to a different color. In such an example, the objective of the color parameter may be to maximize user interaction with a particular aspect of the app, such as a new feature or a premium feature.

In each of these examples, the number of parameter settings available to each user may be two or more. The challenge of selecting parameters for each user may be treated as a multi-armed bandit problem. A machine learning algorithm may be utilized to solve the problem. In some cases, the machine learning algorithm may be a linear regression model. The model may be trained on the user performance data received by the one or more computing devices 110. In one embodiment, a separate model may be set up for each individual user and trained on the user's own user performance data. In another embodiment, a single model may be designed for all of the users and trained on all of the user performance data collected from the plurality of users. The user performance data may include or exclude information about the users' interaction with the app before transmission of the first parameter setting.

Performance drivers for training the model may include any one or combination of: a reward difference between or among the candidate arms; a variance between rewards, whereby a lower variance is better; a sample size of data, whereby a larger sample size is better; context data, such as relationships or correlations between candidate parameters and particular factors of the objective and the relative strengths of those relationships; and temporal responsiveness information indicating how long an adaptation to a change in parameters is expected to take.

In some examples, a separate model may be set up for each individual parameter subject to the app configuration event. In other examples, multiple parameters may be adjusted by a single model, whereby the model receives as input the user performance data, parameter objectives for each parameter subject to the app configuration event, and the candidate values of each parameter. The model may then determine, on a user-by-user basis, a set of candidate values—one candidate value for each parameter—to which an individual user's app should be adjusted to maximize the objective based on a prediction of the model.

For each individual user of the app, the parameter analysis 188 may be used to adjust parameters 190 of that individual user's app. As noted in connection with FIG. 2, each parameter may be adjusted to any one of the particular candidate values 224 defined by the app configuration event 220. The adjusted parameters may be transmitted to the apps of the individual user devices in the form of new app update instructions 184.

The one or more computing devices 110 may be configured to repeatedly collect user performance data, analyze the collected data, adjust individual users' parameters based on the analysis, and push the adjusted parameters to the individual users' devices at a predetermined frequency. The predetermined frequency may vary depending on the particular app or type of app that is being updated. For instance, an app downloaded by many users may receive an abundance of user performance data within a relatively short period of time, so parameters may be adjusted as frequently as on an hourly basis. Conversely, another app may have been downloaded by relatively few users and not receive much user performance data, so parameters may be adjusted on a less frequent basis such as on a daily basis or even a weekly basis. Other update frequencies anywhere between one hour to one week, to multiple weeks, or even to one month are possible.

The one or more computing devices 110 may further be capable of conducting an app configuration event analysis 195 and providing updates to the app developer concerning the app configuration event. The app configuration event analysis 195 may involve analyzing changes in fulfillment of the objective overtime. Fulfillment of the objective can be quantified as a score, whereby a higher score may be indicative of a greater fulfillment of the objective. For example, if the objective of a given parameter is to maximize revenue, the score for that parameter's objective may be tied to revenue received from the app. For further example if the objective is to maximize user engagement, the score for that parameter may be tied to an amount of time that users collectively engage with the app. Scores for the objective may be collected over each iteration of user performance data collection and parameter adjustment. Over time, as the parameters for each user become tailored to the user's personal preferences, the score of the objective may either increase or decrease. An increasing score may indicate a successful app configuration event. A non-increasing or decreasing score may indicate an unsuccessful app configuration event.

In some cases, it is possible that the score will decrease even if the app configuration event is successful. For instance, it is possible that popularity of the app wanes over time, or that interests of the users change overtime, regardless of the parameters applied to the app. Conversely, scores may increase even during an unsuccessful event if the increase is due to factors external to the adjusted parameters. Because of such possibilities, it may be advantageous to compare the score against a score of a control group. Thus, the one or more computing devices may be further capable of designating a first portion or plurality of users of the app as a test group and a second portion or plurality of users of the app as a control group. Parameter adjustment operations of the test group may proceed as described above, whereby user performance data for each user of the test group may be collected, and parameters of the apps of the test group may be adjusted according to the collected user performance data. Parameter adjustment operations for the control group may be made at random, whereby the apps of different users of the control group are provided with different sets of parameters. User performance data of the control group can also be collected. Although it is possible to associate the user performance data of the control group with the individual users, this is typically not necessary as the user performance data is not utilized to control and adjust parameters of the individual users to which the data is associated. Therefore, the user performance data of the control group may be collected and analyzed as a whole.

Figure 3:
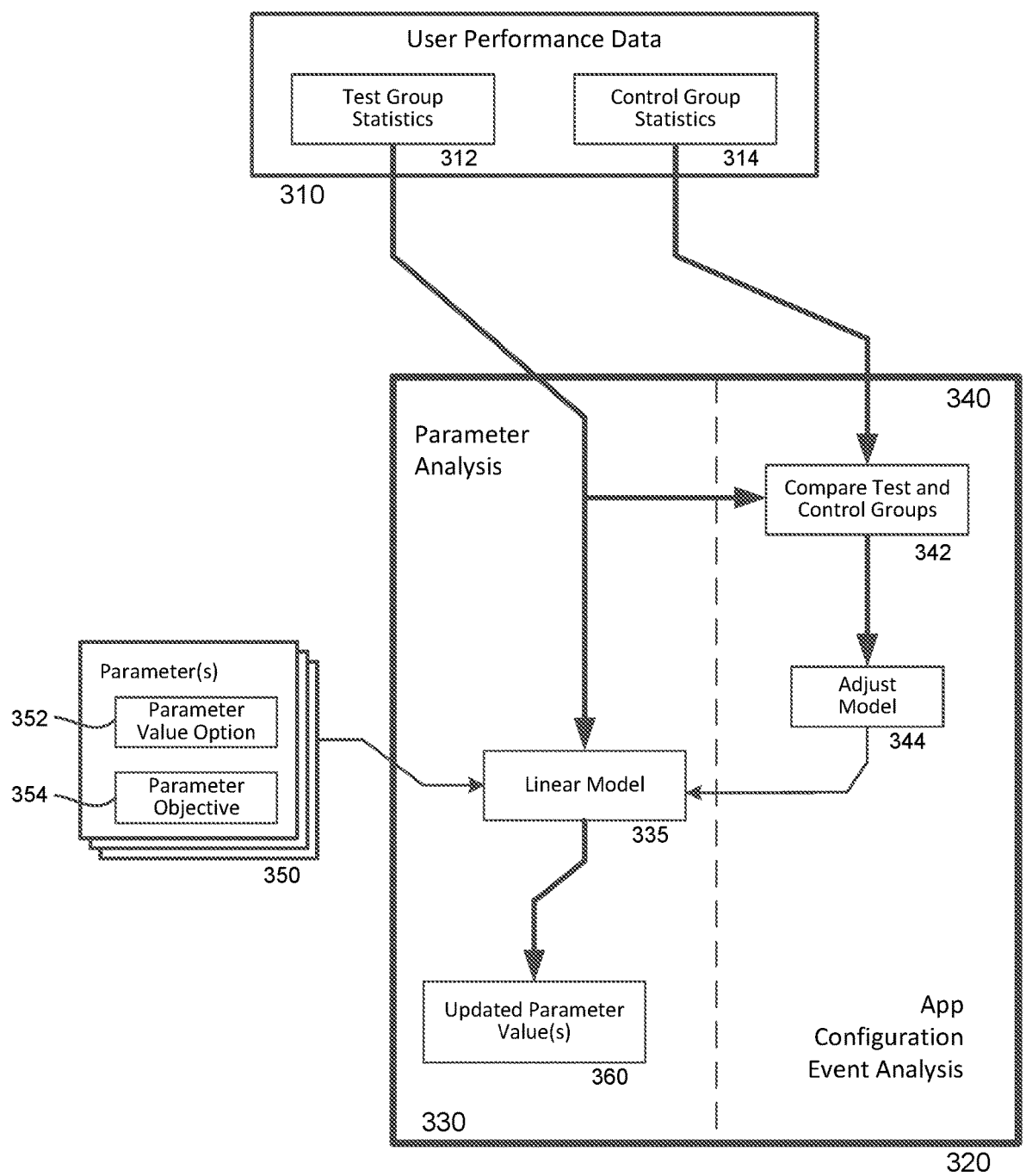
FIG. 3 is a functional block diagram of an example parameter analysis and event analysis of the system of FIG. 1.

FIG. 3 is a functional block diagram that illustrates an example system 300 for analyzing parameters and an app configuration event based on user performance data collected from both a test group and a control group. Block 310 of FIG. 3 represents the user performance data collected by the one or more computing devices. This data is divided into test group statistics 312 and control group statistics 314. The test group statistics 312 may be user performance data of the test group, statistics derived from the user performance data, or both. The control group statistics 314 may be user performance data of the control group, statistics derived from the user performance data, or both.

Block 320 of FIG. 3 represents the analysis of the collected user performance data. The analysis 320 involves both parameter analysis 330 of the individual users included in the test group, and app configuration event analysis 340 of the app configuration event as a whole.

The parameter analysis 330 may involve, for each individual user of the test group, analyzing the user performance data of the individual user and determining one or more adjustments to the parameters of the individual user's app. This determination may be made using an algorithm, such as a machine learning algorithm, or more particularly such as a linear regression model 335. Inputs to the linear regression model may include the user performance data of the individual user and the user performance data of other test group users, control group users, or both. The linear regression model may further take the parameter candidate values 352 and parameter objectives 354 of the parameters 350 subject to the app configuration event as inputs in order to predict whether a given candidate parameter value would improve fulfillment of the corresponding objective. The linear regression model may provide an updated parameter value 360 as an output. The parameter value may be selected so as to minimize a cost function of the model when provided with the input of the user's performance data.

Figure 4:
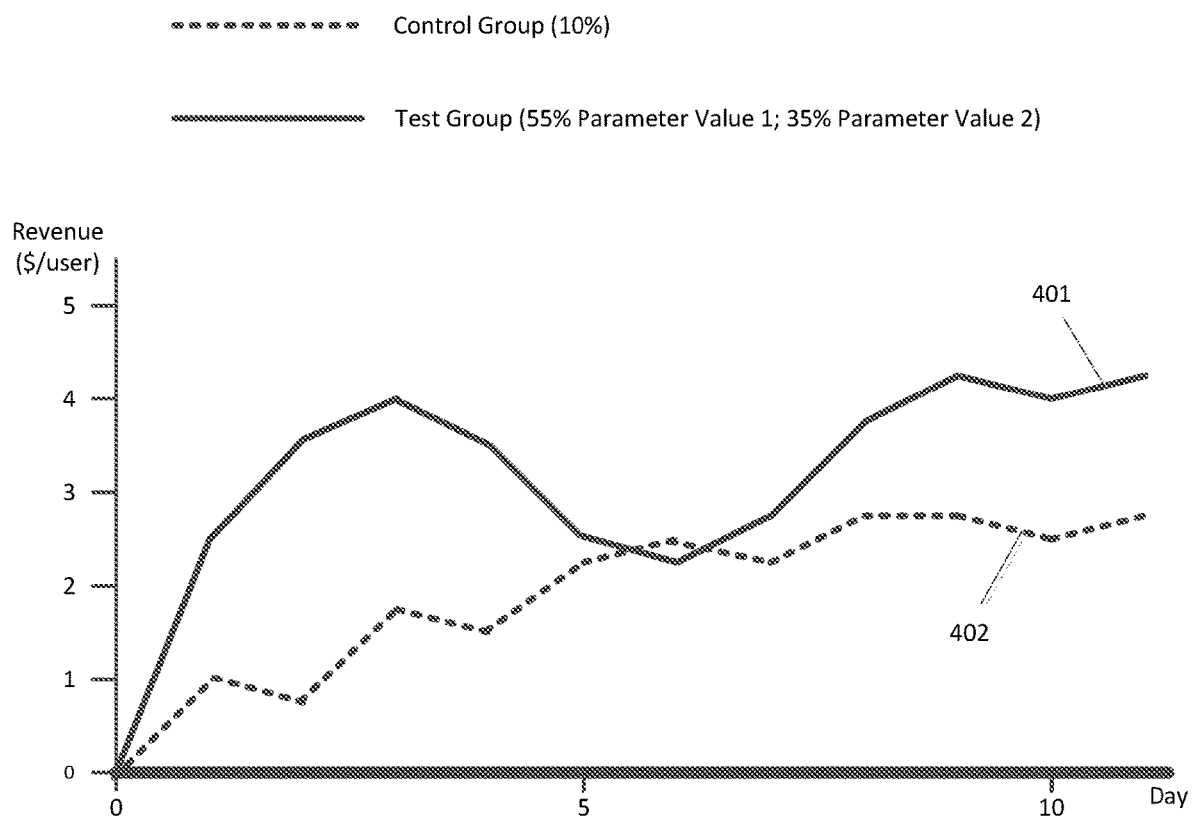
FIG. 4 is a graphical illustration of an example visualization of results from a app configuration event in accordance with an aspect of the disclosure.

The app configuration event analysis 340 may involve analyzing and comparing 342 both the test group user performance data 312 and the control group user performance data 314. The analysis may involve, for each parameter or group of parameters of the app configuration event, calculating a score for each of the test group and the control group, whereby the score may correspond to fulfillment of the objective of the parameter or group of parameters. A higher score may be indicative of a greater fulfillment of the objective. FIG. 4 illustrates an example comparison of a control group and a test group. In the example of FIG. 4, an objective of the app configuration event is revenue, which is measured in dollars per user, and a score for the objective is calculated on a daily basis over the course of the app configuration event. A first line 401 corresponds to the test group score for the revenue, and a second line 402 corresponds to the control group score for the revenue. The lines indicate an overall increase in revenue for both the test group and the control group over the course of the app configuration event. This indicates that revenue may have been expected to increase even without attempting to optimize the parameters of the users. However, the lines also indicate that revenue increased by a greater amount among the test group user than among the control group users. In particular, the difference in revenue increase is over a dollar per user between the two groups. This indicates that the app configuration event was successful in increasing the objective, that is revenue, by about a dollar per user over the course of the event.

The app configuration event analysis is useful in several respects. First, it allows the app developer to inquire whether the app configuration event is having a productive effect on the specified objectives of the subject parameters, a counterproductive effect on the objective, or no effect at all. Second, it shows the changes in these effects over time during the app configuration event. This second advantage may be useful for predicting changes in revenue. For instance, if the difference in revenue between the test and control groups increases quickly over the first few days of the event and then does not change afterward, this could indicate that the revenue increase due to the event has been maximized and is not expected to increase further. Conversely, if the difference in revenue between the test and control groups increases steadily over the course of the event, this could indicate that the revenue increase due to the event has not yet been maximized and may be expected to increase further.

The information shown in FIG. 4 may be transmitted to the app developer automatically or in response to a request received from the app developer device. The request, information, or both may be sent over a network connection, such as the network 120 in the example system of FIG. 1. As shown in FIG. 4, the information provided may further include statistics regarding, for each parameter, percentages of each candidate parameter value that is provided the test group users. In the case of a set of parameters that are adjusted collectively, the percentages may indicate a percentage of users for each individual candidate parameter value, for each set of candidate parameter values, or both.

In some examples, the app configuration event analysis 340 may further be used to control or adjust 344 the model 335. For instance, if the comparison between the test group score and the control group score shows that test group score is lower than the control group score, not higher than the control group score, or higher than the control group score by less than a threshold amount, it may indicate that the app configuration event is not fulfilling the predetermined objective. This may either mean that no adjustment to the parameters can improve fulfillment of the objective, or that the model is flawed and undermining the objective instead of fulfilling it. Therefore, if the app configuration event analysis reveals such a flaw in the event, the analysis can be used to stop or pause the event. Alternatively, the analysis may trigger control group data being provided to re-train the model, whereby the event may be restarted according to the re-trained model.

Example Methods

Figure 5:
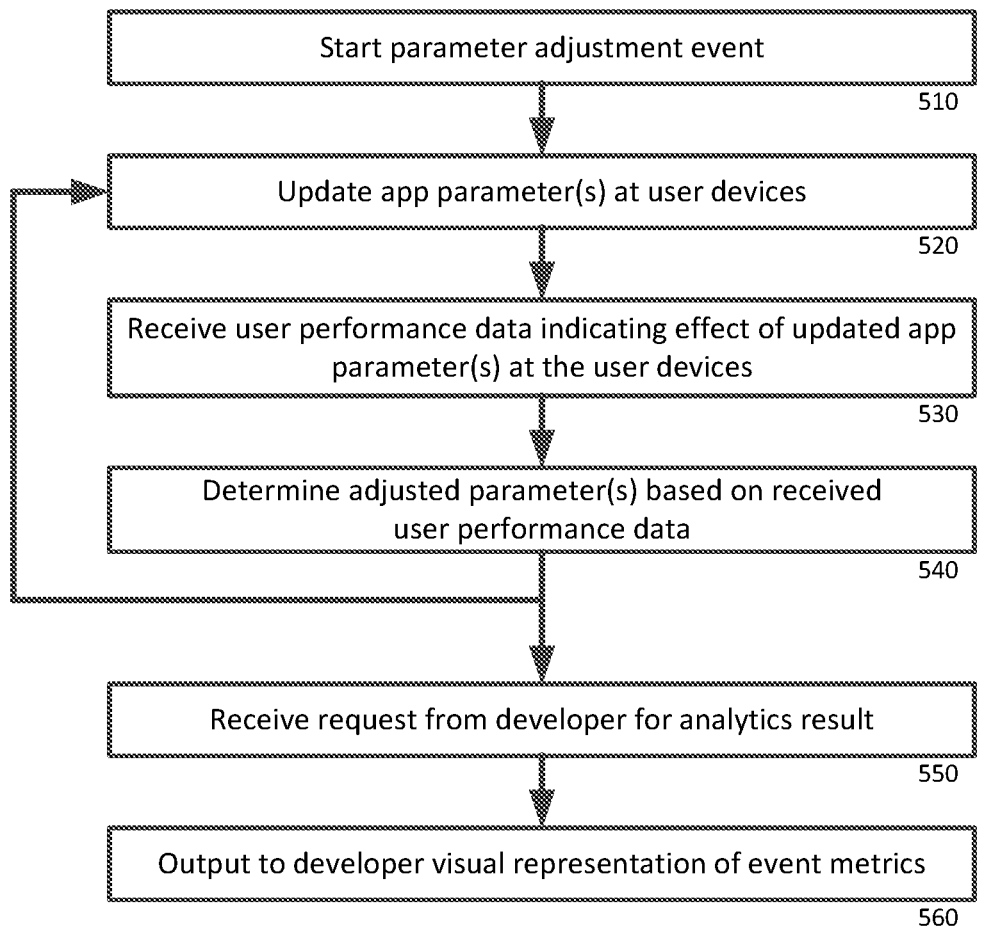
FIGS. 5 and 6 are flow diagrams of an example routine and subroutine, respectively, in accordance with an aspect of the present disclosure.

FIG. 5 is a flow diagram of an example routine 500 for conducting an app configuration event in accordance with the underlying principles of the present disclosure. It should be understood that the steps in this routine may be performed in the stated order or in a different order. Also, in other examples, certain steps may be added, omitted, or replaced.

At block 510, the one or more processors of the computing devices start an app configuration event for adjusting one or more parameters of an app on a user-by-user basis. The event may be started in response to an instruction received from the app developer. In some instances, the event may start immediately upon receiving the instructions. In other instances, the instruction may specify a later time for the event to begin. The instruction may include a list of parameters to be adjusted, candidate parameter values for each parameter, and an objective to be fulfilled for each parameter.

To illustrate, in an example app configuration event, the app developer may wish to determine pricing for a particular item for purchase within the app, such as a token within a game. In such a case, the candidate parameter values may be different candidate prices, such as $0.99, $1.29, $1.49, and $1.99. A default parameter value may be set before or during the event. For instance, the default value may be $0.99. Additionally, the objective for the parameter may be revenue quantified in dollars per user.

At block 520, the one or more processors update the parameters at the user devices according to a model. Since the model has not yet been provided with any user data regarding the candidate values other than the default parameter value, this step may either maintain the default parameter values or may randomly update parameter values. Alternatively, the model may have information about past user behavior, which may inform this first parameter adjustment step. For instance, and following the same pricing example, the one or more processors may determine to maintain the $0.99 pricing for users that do not regularly or do not ever purchase the item in question, and may determine to increase the pricing for other users that regularly purchase the item. In some instances, the amount of the adjustment may be based on a frequency of the user's purchase.

At block 530, the one or more processors receive user performance data in the form of app usage statistics from the device of each user with the app. The user performance data may be associated with an identification of its corresponding individual user, such that behavior of the individual user can be processed and analyzed by the one or more processors using the user performance data. The processed data may provide information about the user's fulfillment of the parameter's objective. To illustrate, in the pricing example, the user performance data may indicate an amount of money spent by the individual user on the item for purchase.

At block 540, the received user performance data may be used to determine an adjusted parameter for the individual user. The update may involve using an algorithm or model to predict a candidate parameter value that would increase fulfillment of the parameter's objective. To illustrate, in the same pricing example, if the user performance data of the individual user indicates that the user is not making purchases, then the price may be changed to a lower candidate parameter value. Conversely, if the user performance data of the individual user indicates that the user is making purchases, then the price may be changed to a higher candidate parameter value. In the case of a machine learning model, these predictions may be based further on data collected from other users. For instance, it may be observed that many other users continue to purchase the item until a threshold cost, such as $1.49 is reached. This information may be used to optimize the cost for other users to $1.49 instead of increasing the cost to $1.99.

The steps at blocks 520, 530 and 540 may be performed separately for each individual user of the app. In this manner, the parameter at issue may be adjusted on a user-by-user basis, such that one user interacting with the app in one way may receive a different parameter than a user interacting with the app in another way. Additionally, these steps may repeat cyclically, with the one or more processors continuing to collect user performance data after the parameter update. Over the course of several cycles of updates, a model used to predict user behaviors may be improved or optimized so that the parameters provided to individual users become better and better at fulfilling the objective of the parameter at issue. In the example of the item for purchase, this may involve some users being charged $1.49 while other users are charged $0.99 while even other users are charged $1.99. Similar approaches may be taken for other parameters, such as a difficulty of the game or the color of a button included in the game.

At block 550, the one or more processors receive a request from the app developer for analytics results of the app configuration event. In the aforementioned example, this may involve the app developer querying the one or more processors to determine whether overall revenue from the purchase in question has increased or decreased over time. At block, 560, the one or more processors, in response to the request, may output to the app developer a report on the app configuration event. This may include a visual representation of event metrics, such as, for each parameter, changes to fulfillment of the parameter's objective over time. In the example of an item for purchase, the visual representation may show changes to the dollars per user earned over the course of the event.

The example routine 500 of FIG. 5 may be modified to include a control group. In such an example, the parameters of the test group may be adjusted according to the model, and the parameters of the control group may be adjusted at random.

Figure 6:
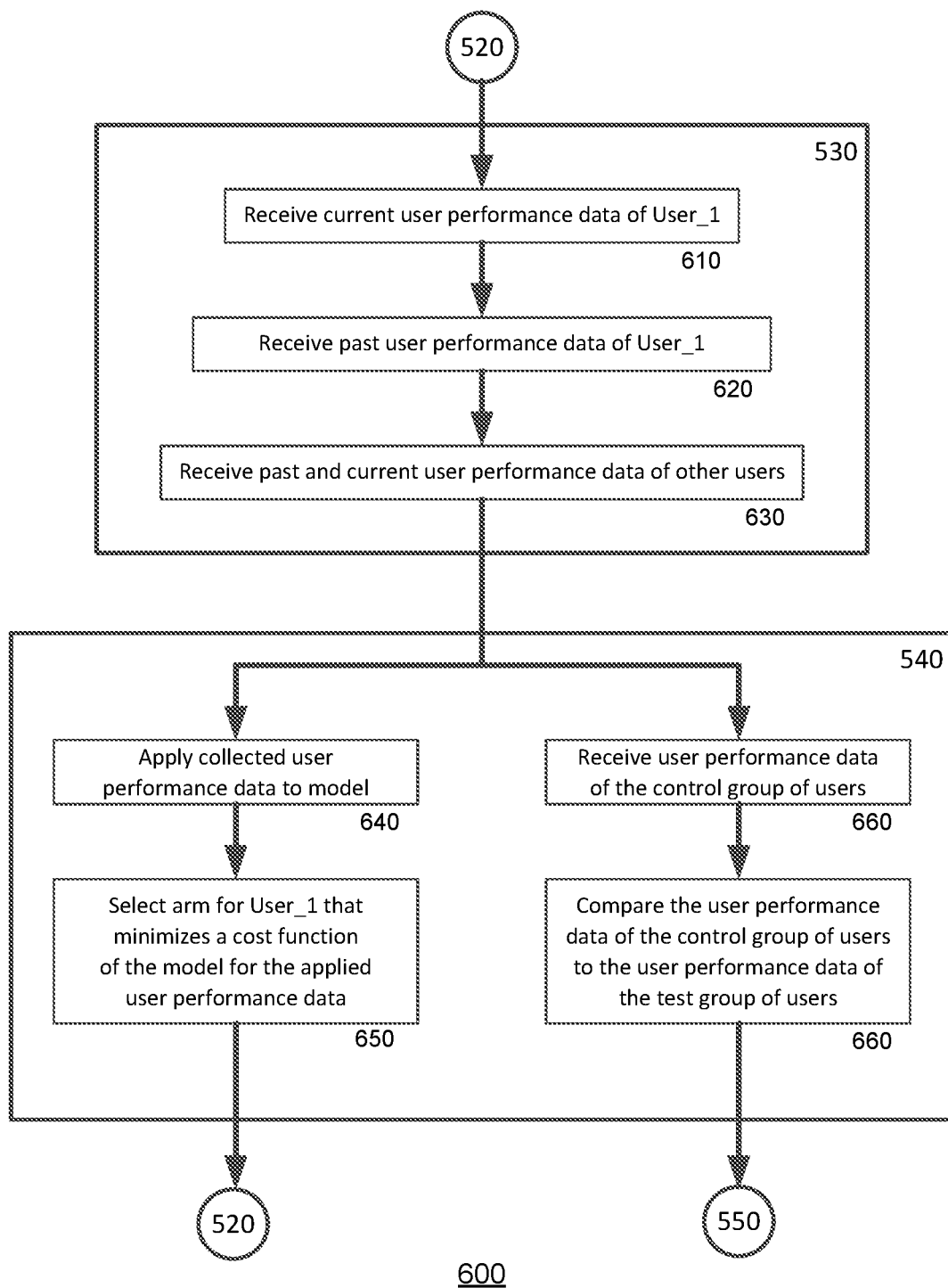

FIG. 6 further illustrates an example subroutine 600 of the routine 500 of FIG. 5 for determining user-specific parameters and for analyzing the app configuration event based on both a test group and a control group of users. Blocks 610, 620 and 630 of FIG. 6 provide further detail regarding the user performance data received at block 530 of FIG. 5. Blocks 640, 650, 660 and 670 of FIG. 6 provide further regarding the determinations performed at block 540 of FIG. 5.

At block 610, for adjusting the parameters of a specific individual user, current user performance data of the individual user is collected. The current user performance data may be data reflecting the individual user's interactions with the app after initiation of the app configuration event. At block 620, past user performance data of the individual user is also collected. The past user performance data may be data reflecting the individual user's interactions with the app prior to initiation of the app configuration event. At block 630, past user performance data, present user performance data, or both, of other users of the app may be collected. The other users may be exclusively users of the test group, exclusively users of the control group, or both.

At block 640, the collected user performance data from block 530 is applied to the model. At block 650, an arm is selected for the individual user. The arm may be a candidate parameter value or set of candidate parameter values that minimizes a cost function of the model based on the applied user performance data. In other words, the model may determine an optimized set of app settings for the individual user that may maximize fulfillment of the objective of the adjusted parameter or set of parameters. The arm may then be provided as an instruction to the individual user's app at block 520 in order to update the parameter settings and configurations of the app. The steps of blocks 640 and 650 may be performed separately for each of the users in the test group of users.

At block 660, the user performance data for the control group of users is received. This data may have been collected already at block 530 or may be collected at block 540. Then, at block 670, the user performance data of the control group of users is compared to the user performance data of the test group of users from block 530. The comparison may compare fulfillment of the parameters' objective for each of the test group and the control group. An example visual representation of a comparison is shown in FIG. 4. The comparison may subsequently be provided to the app developer in response to a request at block 550.

The above examples generally describe a method and system for identifying a best parameter for each individual from among a plurality of candidate parameter values. However, it should be recognized that the principles of the present disclosure can also be applied to other methods and techniques. For instance, the user-by-user evaluation of parameters may also be utilized within A/B testing. For instance, after the app configuration event ending, instead of the system maintaining a personalized parameter for each user, the app configuration event may determine which of the candidate parameter values is the most popular value of the parameter, and may update the apps of all users to have the most popular parameter value. In this regard, the result of the app configuration event may be comparable to the result of an A/B test, although the testing process may be improved by analyzing each user individually.

For further example, the app configuration event may identify patterns in user behaviors that warrant certain changes to the parameter over time. For instance, it could be determined from the app configuration event that certain users respond best to a first parameter setting during weekdays and to a second parameter setting during weekends. Such a pattern may be used to program patterned changes to the parameter configurations even after the app configuration event has ended.

Additionally, the present application generally describes parameter values and objectives as being specified by an app developer. However, in a broader sense, it should be understood that such inputs may be received from any party responsible for managing the app, even if that party is not an app developer. Similarly, requests for event analysis may be received from other parties responsible for managing the app, and the analysis may be provided in response to the request.

One advantage of the systems and methods described in the present disclosure is that they are capable of maximizing app developers' goals and objectives on a user-scale level of detail and differentiation but with relatively low overhead. Processing to determine parameter adjustments for each user can scale linearly with the number of users using the developer's app. Furthermore, adding more users to the app only improves the model used for predicting user performance, which in turn may speed up optimization of an app instead of slowing down the process. Because user performance data from all users can be fed to a single model and the model can provide differentiated results for each user, the model is able to provide personalized adjustments to app parameters, configurations and settings on a per-user basis regardless of the number of users evaluated. Additionally, the systems and methods work for apps having any number of users, whether the app is used by a small number of users or a large number of users. This means that a single solution can be provided for all developers.

Another advantage of the systems and methods is that they are easy for app developers to understand, set up, operate and interpret. Because the one or more computing devices of the system can include their own memory and processors, the entire system may be operated from a cloud-based platform. The platform may provide an easy and intuitive interface for app developers or managers to upload or update app parameters, set objectives, set app configuration events, and view event analytics.

Although the technology herein has been described with reference to particular embodiments, it is to be understood that these embodiments are merely illustrative of the principles and applications of the present technology. For example, although some embodiments described herein discuss parameters of an "app," it is merely illustrative and it should be recognized that the same principles may be applied to other programs used by multiple users even if such a program is not generally considered to be an "app." It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of conducting a parameter update event comprising:
    transmitting, by one or more processors, first parameter settings to a program at a first plurality of users and second parameter settings to the program at a second plurality of users, wherein the second parameter settings are randomly selected for each of the users of the second plurality of users;
    receiving, by the one or more processors, performance information indicating performance of the program for each of the first plurality of users and the second plurality of users after the first parameter setting and the second parameter setting, wherein the performance information for each user of the first plurality of users is separately identifiable;
    for each individual user of the first plurality of users:
        determining, by the one or more processors, a user-specific parameter setting update based at least in part on the performance information of the individual user; and
        transmitting, by the one or more processors, the user-specific parameter setting update to the program.

2. The method of claim 1, wherein the user-specific parameter setting update is determined based further on past performance information of the user before the first parameter setting.

3. The method of claim 1, wherein the parameter setting update is determined based further on performance information of other users of the first plurality of users after the first parameter setting.

4. The method of claim 1, wherein receiving performance information, determining a parameter setting update, and transmitting the parameter setting update are repeated periodically according to a predetermined frequency for updating the program.

5. The method of claim 4, wherein the predetermined frequency is between one hour and one week.

6. The method of claim 4, further comprising:
    receiving, by the one or more processors, a parameter update event instruction indicating available parameter settings and an objective, wherein the first parameter settings and the user-specific parameter setting updates are selected from the available parameter settings, and wherein the user-specific parameter setting updates are determined based on the objective.

7. The method of claim 6, wherein the objective includes one or more factors defined by user interaction with the program.

8. The method of claim 7, wherein the one or more factors includes at least one of: money spent in the program; time spent interacting with the program; times opening the program; or user-rating of the program.

9. The method of claim 6, further comprising, in response to receiving the performance information, calculating, by the one or more processors, a test group score for the first plurality of users, wherein a higher score is indicative of greater fulfillment of the objective.

10. The method of claim 9, further comprising, in response to a request for analysis of the parameter update event, transmitting, by the one or more processors, data indicating one or more changes to the group score over time.

11. The method of claim 6, further comprising, in response to receiving the performance information for the first and second pluralities of users:
    calculating, by the one or more processors, a test group score for the first plurality of users, wherein a higher test group score is indicative of greater fulfillment of the objective; and
    calculating, by the one or more processors, a control group score for the second plurality of users, wherein a higher control group score is indicative of greater fulfillment of the objective.

12. The method of claim 11, further comprising, in response to a request for analysis of the parameter update event, transmitting, by the one or more processors, data providing a comparison between the test group score and the control group score.

13. The method of claim 1, wherein the program is one of a mobile device application or a web application, wherein transmitting the first parameter settings to the program comprises transmitting the first parameter settings to the mobile device application at a plurality of mobile devices or to the web application.

14. A system for conducting a parameter update event comprising:
    one or more processors; and
    memory storing instructions configured to cause the one or more processors to:
        transmit first parameter settings to an application used by a first plurality of users and second parameter settings to the application used by a second plurality of users, wherein the second parameter settings are randomly selected for each of the users of the second plurality of users;
        receive performance information indicating performance of the application for each of the first plurality of users and the second plurality of users after the first parameter setting and the second parameter setting, wherein the performance information for each individual user of the first plurality of users is separately identifiable;
        for each individual user of the first plurality of users:
            determine a parameter setting update based at least in part on the performance information of the individual user; and
            transmit the parameter setting update to the application of the individual user.

15. The system of claim 14, wherein the instructions are configured to cause the one or more processors to repeatedly receive performance information, determine a parameter setting update, and transmit the parameter setting update periodically according to a predetermined frequency for updating the application.

16. The system of claim 15, wherein the instructions comprise a machine learning algorithm to determine the parameter setting update.

17. The system of claim 14, wherein the instructions are configured to cause the one or more processors to, in response to a request for analysis of the parameter update event, transmit data providing a comparison between the performance information from the second plurality of users and the performance information from the first plurality of users.

18. A system for conducting a parameter update event comprising:
 one or more processors; and
 memory storing instructions configured to cause the one or more processors to:
  transmit first parameter settings to an application used by a first plurality of users;
  receive performance information indicating performance of the application after the first parameter setting, wherein the performance information for each individual user of the first plurality of users is separately identifiable;
  for each individual user of the first plurality of users:
   determine a parameter setting update based at least in part on the performance information of the individual user; and
   transmit the parameter setting update to the application of the individual user,
 wherein the instructions are configured to cause the one or more processors to repeatedly receive performance information, determine a parameter setting update, and transmit the parameter setting update periodically according to a predetermined frequency for updating the application,
 wherein the instructions comprise a machine learning algorithm to determine the parameter setting update, and
 wherein the machine learning algorithm is a linear regression model trained on at least one of: past performance information of the individual user before the first parameter setting; performance information of other users of the first plurality of users before the first parameter setting; or performance information of other users of the first plurality of users after the first parameter setting.

* * * * *